C. S. BARRY.
Piston Packings.

No. 140,608.    Patented July 8, 1873.

WITNESSES.
Villette Anderson
Chas. B. Steele

INVENTOR.
Charles S. Barry
Chipman Hosmer & Co.
Attorneys

UNITED STATES PATENT OFFICE.

CHARLES S. BARRY, OF PROVIDENCE, RHODE ISLAND.

IMPROVEMENT IN PISTON-PACKINGS.

Specification forming part of Letters Patent No. 140,608, dated July 8, 1873; application filed May 10, 1873.

*To all whom it may concern:*

Be it known that I, CHARLES S. BARRY, of Providence, in the county of Providence and State of Rhode Island, have invented a new and valuable Improvement in Piston-Packing; and I do hereby declare that the following is a full, clear, and exact description of the construction and operation of the same, reference being had to the annexed drawings making a part of this specification, and to the letters and figures of reference marked thereon.

Figure 1:
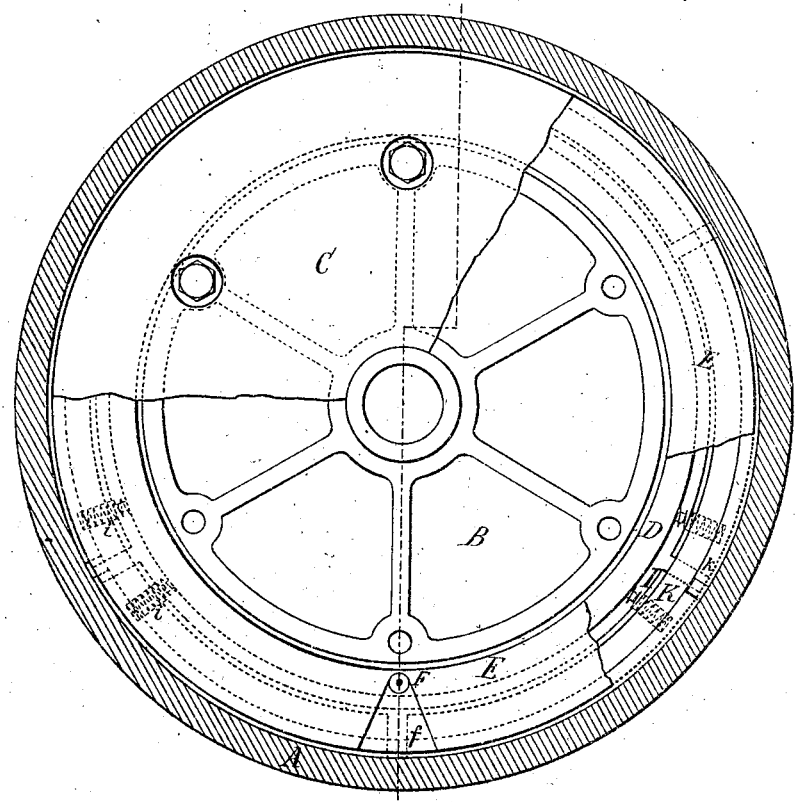
Figure 2:
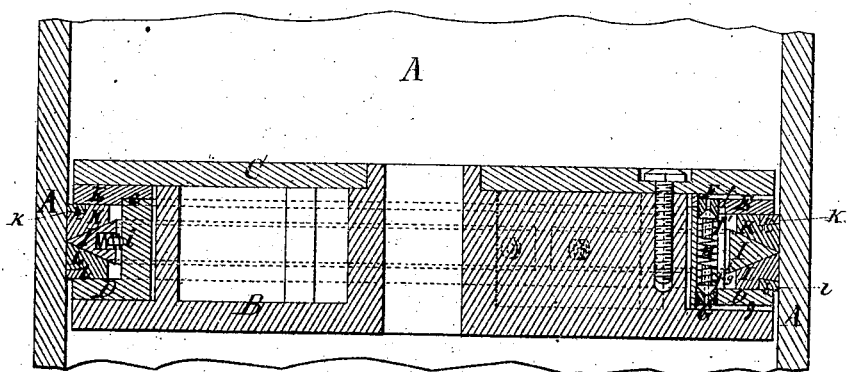

Figure 1 of the drawings is a representation of a piston with my improved packing and a part of surrounding steam-cylinder in section by a top view. Fig. 2 is a vertical central section of the same.

My invention relates to self-adjusting packing for steam-pistons; and it consists in a novel construction and arrangement of a system of packing and wedging rings in an annular incasement inserted into the piston, and provided with balancing-valves for the admission of steam into an annular space behind the said packing-rings, to expand the said rings in the place of springs.

In the drawings, A represents a part of a steam-cylinder inclosing a piston, B, with follower C, constructed in the ordinary manner. The annular space between the piston and follower is occupied by an L-shaped ring, D, and concentric cover E, which are nicely fitted and ground together, so that their joint e is steam-tight, and which are fitted very tightly between the piston B and follower C. These rings are provided with two valve-seats, F and G, opposite each other, and opening in opposite directions to admit steam from either side of the piston into the space between the said rings. A passage for the steam to the valve-seat F is provided by a depression, $f$, on the cover E, and a similar depression, $g$, admits the steam, on the other side of the piston, to the valve-seat G. The said two valve-seats are closed by two valves, $f'$ $g'$, which are fastened to both ends of a spiral spring, H, and work without friction, because they have no guides to slide in or on. The hole, which incloses valve-seats, valves, and spring, has a lateral opening into the space between the ring D and cover E. The steam-packing proper consists of a doubly-sloped wedge-ring, I, an upper packing-ring, K, and a lower packing-ring, L, and corresponding break-joint rings $k$ $l$, constructed according to principles well known to machine-builders. The wedge-ring I is kept in position, when the steam-engine is at rest, by springs $i$, which expand it, and thereby, with the aid of the double slope on the wedge-ring, expand also the packing-rings K and L, with their break-joint rings $k$ and $l$, and form hereby a packing against their upper and lower bearings in the incasement-rings D and E, as well as a packing against the inner circumference of the steam-cylinder. This packing is only sufficiently strong when aided by steam-pressure acting on the backs or inside surfaces of the rings K, I, and L, which is caused by the steam admitted through the passages $f$ and $g$ and through the valve-seats F and G into the space left behind the said rings for that purpose. The tension of the spring H creates a difference of pressure inside the piston from that outside of it, and forms the means of regulating the pressure within the steam-packing. The sectional shape of the break-joint rings $k$ and $l$ is wedge-like, pointing or tapering toward the outside, which serves to keep them from slipping out of their places when the piston is inserted into or removed from the cylinder.

By inclosing the packing-rings K L with their adjuncts into a separate incasement, as that formed by the rings D and E, I obtain an independent and movable packing, which, for construction and repair, offers important facilities. The piston, according to the old method of construction, after being roughly finished, is fastened to the piston-rod, the follower fastened to it, and the side bearings finished and ground together with the rings. This is the most delicate job in steam-fitting, and requires great care and time; and often, when the packing-rings are not tight enough, after being ground, the steam-joint between piston and follower has to be overhauled and the grinding repeated. The grinding of my steam-joints has to be done only once, and the wear of the same does not subject them to such frequent repairs as is the case with steam-pistons of ordinary construction. The repair or exchange of the packing-rings does not necessitate the removal of the piston from the cylinder and its detachment from cross-head, connecting-rod, &c.; but by simply removing the follower, I am able to withdraw the whole packing with all its bearings. The steam-packing above described is self-adjusting; the steam-pressure, being diminished by condensation, causes the steam in the cylinder to open the valves and balance the difference by fresh supplies.

It is hardly necessary to mention that the several rings I K L k l may each one be made of several pieces. The valve-seats F and G are screwed into the cover E and ring D, and, by screwing them closer together or further apart, the tension of the spring H is changed, and, consequently, the pressure of the steam behind the packing-rings.

What I claim as new, and desire to secure by Letters Patent, is—

1. The combination of the L-shaped ring D and cover E, inclosing the packing-rings K L, the joint-break rings k l, and the wedge-ring I, the spring H, the valves f' g', the valve-seats F G, and the steam-ways f g, substantially as specified.

2. The combination of the wedge-expanding ring I, the packing-rings K L, and the joint-break rings k l, forming a universal piston-packing between the parallel bearings of a piston, when operated either by steam or by spring power, substantially as specified.

In testimony that I claim the above I have hereunto subscribed my name in the presence of two witnesses.

CHARLES S. BARRY.

Witnesses:
 H. C. WATERS,
 C. E. BIGELOW.